(12) United States Patent
Takahashi

(10) Patent No.: US 7,702,151 B2
(45) Date of Patent: Apr. 20, 2010

(54) IMAGE PROCESSING APPARATUS AND METHOD FOR CHANGING THE DYNAMIC RANGE OF AN IMAGE

(75) Inventor: Naoto Takahashi, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1048 days.

(21) Appl. No.: 11/118,423

(22) Filed: May 2, 2005

(65) Prior Publication Data
US 2005/0254707 A1    Nov. 17, 2005

(30) Foreign Application Priority Data
May 11, 2004 (JP) ............................. 2004-141553

(51) Int. Cl.
G06K 9/00 (2006.01)
G06K 9/34 (2006.01)
G06K 9/38 (2006.01)

(52) U.S. Cl. .................. 382/169; 382/168; 382/171; 382/172

(58) Field of Classification Search ............. 382/168, 382/169, 171, 172
See application file for complete search history.

(56) References Cited

U.S. PATENT DOCUMENTS

| | | | | |
|---|---|---|---|---|
| 5,008,946 A | * | 4/1991 | Ando | 382/104 |
| 5,012,333 A | * | 4/1991 | Lee et al. | 358/520 |
| 5,487,116 A | * | 1/1996 | Nakano et al. | 382/104 |
| 6,850,634 B1 | | 2/2005 | Shinbata | 382/132 |
| 7,013,035 B2 | | 3/2006 | Shinbata | 382/132 |
| 7,065,261 B1 | * | 6/2006 | Horie | 382/289 |
| 7,321,686 B2 | * | 1/2008 | Shibata et al. | 382/168 |
| 2002/0006230 A1 | * | 1/2002 | Enomoto | 382/261 |
| 2003/0120152 A1 | * | 6/2003 | Omiya | 600/443 |
| 2004/0001637 A1 | * | 1/2004 | Mitchell et al. | 382/239 |
| 2005/0036670 A1 | | 2/2005 | Shinbata | 382/132 |
| 2005/0169534 A1 | | 8/2005 | Takahashi | 382/203 |

FOREIGN PATENT DOCUMENTS

JP    2001-094828    4/2001
JP    2002-247364    8/2002

OTHER PUBLICATIONS

Hideki Tamura, "Computer Imaging Processing Approach", (Japan) Soken-Shuppan, pp. 95-97.
Anan et al., "Journal of Japan Radiological Society", Aug. 1989, vol. 45, No. 8, p. 1030.

* cited by examiner

*Primary Examiner*—Samir A. Ahmed
*Assistant Examiner*—Li Liu
(74) *Attorney, Agent, or Firm*—Fitzpatrick, Cella, Harper & Scinto

(57) ABSTRACT

A histogram is generated on the basis of the pixel value of an image. An LUT used for changing the dynamic range of the image is generated on the basis of the histogram value in each pixel value interval of the generated histogram. The dynamic range of the image is changed on the basis of the generated LUT.

6 Claims, 14 Drawing Sheets

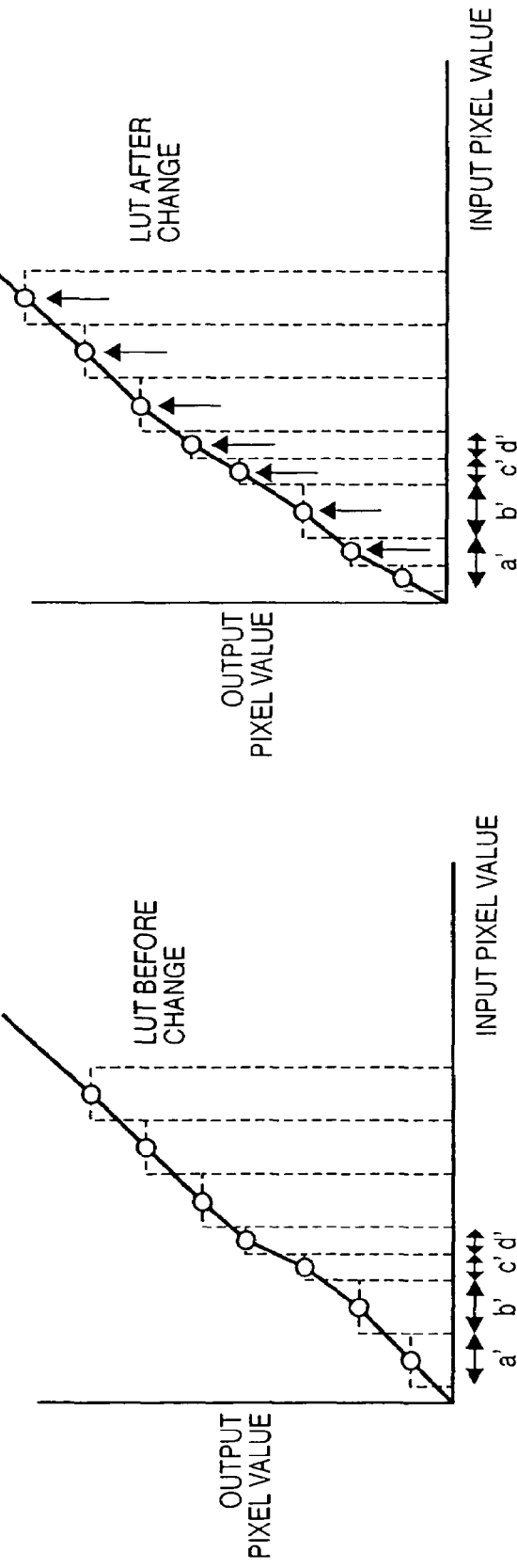

IMAGE PROCESSING APPARATUS AND METHOD FOR CHANGING THE DYNAMIC RANGE OF AN IMAGE

FIELD OF THE INVENTION

The present invention relates to an image processing apparatus which changes the dynamic range of an image, and a method and program therefor.

BACKGROUND OF THE INVENTION

As the digital technology progresses recently, people convert a radiographic image into a digital image signal (the value of a pixel contained in the digital image signal will be referred to as a pixel value), execute image processing for the digital image signal, and display the image on a display device such as a CRT or output the image to a film.

When a radiographic image is sensed, generally, tone conversion processing is executed by using a linear LUT or an LUT with an S-shaped tone conversion curve representing the characteristic of a film to make the converted digital image signal suitable for display or film output.

In X-ray images of human bodies, the dynamic range of the subject changes depending on the individual difference between subjects or radiography conditions. Hence, to optimize the minimum and maximum values of the dynamic range of the subject in advance, the dynamic range of the subject is changed (compressed or expanded) (e.g., reference 1).

According to this method, processing is performed to make the dynamic range of the subject fall within the given dynamic range of the output medium. For this reason, the performance of the output medium can be maximized, and an output image easy to diagnose can be obtained.

In some cases, dynamic range compression processing is executed to make the dynamic range fit in that of the output medium while maintaining the contrast of a fine structure. An example of this method is described in, e.g., reference 2.

In this method, let $S_D$ be the pixel value of an image which has undergone processing, $S_{org}$ be the pixel value of the original image, and Sus be the average pixel value (pixel value of the smoothed image) obtained by calculating the moving average of the original image on the basis of a mask size of M×M pixels. The processing is executed by $$S_D = S_{org} + f(Sus) \quad (1)$$

$$Sus = \Sigma S_{org}/M^2 \quad (2)$$

using a monotone decreasing function f(x). Equation (1) can be rewritten to $$S_D = (S_{org} - Sus) + (f(Sus) + Sus) \quad (3)$$
$$= (S_{org} - Sus) + f1(Sus)$$

Since $S_{org}$–Sus corresponds to the high-frequency component of the image, this processing can also be regarded as dynamic range change processing limited to a low-frequency component. Hence, the fine structure corresponding to the high-frequency component can be maintained.

[Reference 1] "Computer Imaging Processing Approach" edited by Hideyuki Tamura, (Japan), Soken-Shuppan, pp. 95-97

[Reference 2] Anan et al, "Journal of Japan Radiological Society", August 1989, Vol. 45, No. 8, p. 1030

In the method described in reference 1, however, when the dynamic range of the image is compressed excessively, the contrast may be too low.

Conversely, when the dynamic range is expanded excessively, the contrast may be too high. The compression or expansion processing is executed uniformly for the entire image. When viewed from the local region basis, an unnecessarily wide dynamic range may be assigned to a small information amount, or a narrow dynamic range may be assigned even when the information amount is large.

In the method described in reference 2, the dynamic range is changed for only a low-frequency component. Hence, even when the dynamic range is compressed excessively, no shortage of contrast occurs.

However, since the low- and high-frequency components are unbalanced, artifacts are generated by overshoot or undershoot. This is particularly conspicuous near an edge where the gradient of pixel value is large. That is, artifacts are generated when a low frequency is assigned to a narrow dynamic range in spite of a large information amount as an edge.

SUMMARY OF THE INVENTION

The present invention has been made to solve the above-described problems, and has as its object to provide an image processing apparatus which can suppress shortage or excess of contrast of an output image and also suppress artifacts in dynamic range compression by generating an LUT to be used for dynamic range change in accordance with the feature amount of an image, and a method and program therefor.

According to the present invention, the foregoing object is attained by providing an image processing apparatus which changes a dynamic range of an image, comprising:

histogram generation means for generating at least one of a density value histogram and a differential histogram of the image;

LUT generation means for generating an LUT used for changing the dynamic range of the image on the basis of a histogram value in each pixel value interval of the histogram generated by the histogram generation means; and changing means for changing the dynamic range of the image on the basis of the LUT generated by the LUT generation means.

In a preferred embodiment, the apparatus further comprises change amount setting means for setting a change amount of the dynamic range of the image, wherein the LUT generation means generates the LUT used for changing the dynamic range of the image, with which the dynamic range set by the change amount setting means is obtained, on the basis of the histogram value in each pixel value interval of the histogram generated by the histogram generation means.

In a preferred embodiment, the apparatus further comprises region extracting means for extracting a region of interest in the image, and change amount setting means for setting a change amount of the dynamic range in the region of interest extracted by the region extracting means, wherein the histogram generation means generates at least one of the density value histogram and differential histogram in the region of interest extracted by the region extracting means, and the LUT generation means generates the LUT used for changing the dynamic range of the image, with which the dynamic range set by the change amount setting means is obtained in the region of interest extracted by the region extracting means, on the basis of the histogram value in each pixel value interval of the histogram generated by the histogram generation means.

In a preferred embodiment, in compressing the dynamic range of the image, the LUT generation means generates the LUT to compress an interval where the histogram value in each pixel value interval is minimum.

In a preferred embodiment, in compressing the dynamic range of the image, the LUT generation means changes and generates the LUT so as to make an output pixel value difference small sequentially from an interval where the histogram value in each pixel value interval is small until an output dynamic range equals a desired dynamic range.

In a preferred embodiment, in expanding the dynamic range of the image, the LUT generation means generates the LUT to expand an interval where the histogram value in each pixel value interval is maximum.

In a preferred embodiment, in expanding the dynamic range of the image, the LUT generation means changes and generates the LUT so as to make an output pixel value difference large sequentially from an interval where the histogram value in each pixel value interval is large until an output dynamic range equals a desired dynamic range.

In a preferred embodiment, the LUT generation means sets a limit value for a compression ratio and expansion ratio in each pixel value interval and generates the LUT in a range of the limit value.

According to the present invention, the foregoing object is attained by providing an image processing method of changing a dynamic range of an image, comprising:

a histogram generation step of generating at least one of a density value histogram and a differential histogram of the image;

an LUT generation step of generating an LUT used for changing the dynamic range of the image on the basis of a histogram value in each pixel value interval of the histogram generated in the histogram generation step; and a changing step of changing the dynamic range of the image on the basis of the LUT generated in the LUT generation step.

According to the present invention, the foregoing object is attained by providing a program which implements image processing of changing a dynamic range of an image, comprising:

a program code for a histogram generation step of generating at least one of a density value histogram and a differential histogram of the image;

a program code for an LUT generation step of generating an LUT used for changing the dynamic range of the image on the basis of a histogram value in each pixel value interval of the histogram generated in the histogram generation step; and a program code for a changing step of changing the dynamic range of the image on the basis of the LUT generated in the LUT generation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14A is a graph for explaining the LUT change procedure according to the embodiment of the present invention; and FIG. 14B is a graph for explaining the LUT change procedure according to the embodiment of the present invention.

DETAILED DESCRIPTION OF THE PREFERRED EMBODIMENT

A preferred embodiment of the present invention will be described in detail in accordance with the accompanying drawings.

Figure 1:
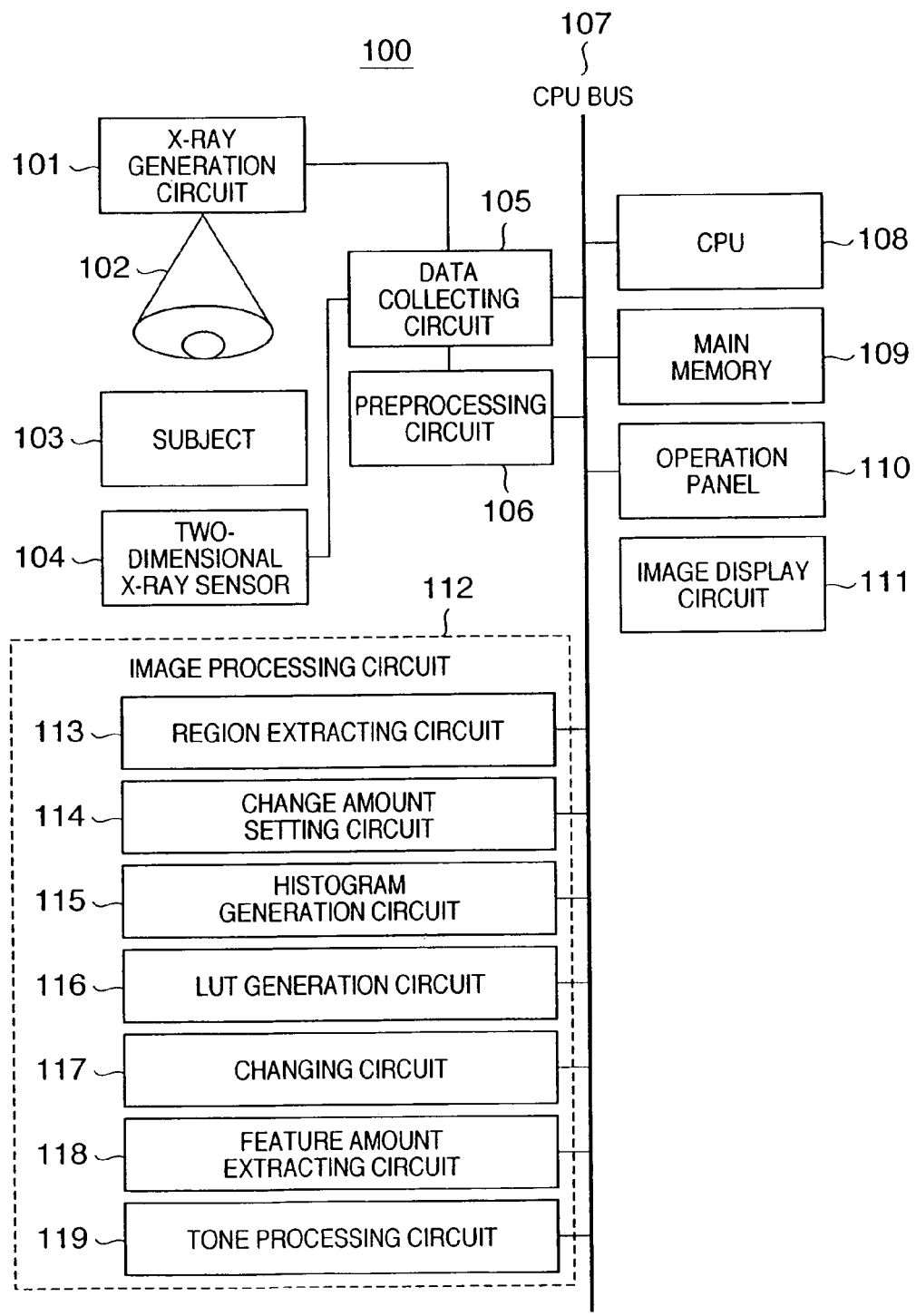
FIG. 1 is a block diagram showing the arrangement of an X-ray imaging device according to the embodiment.

FIG. 1 is a block diagram showing the arrangement of an X-ray imaging device according to this embodiment.

An X-ray imaging device 100 shown in FIG. 1 has a function of executing effective image processing in outputting a radiographed image onto a film or monitor. The X-ray imaging device 100 comprises a data collecting circuit 105, pre-processing circuit 106, CPU 108, main memory 109, operation panel 110, image display circuit 111, and image processing circuit 112. These components are connected through a CPU bus 107 so that data can be transferred between them.

In the X-ray imaging device 100, the data collecting circuit 105 and preprocessing circuit 106 are connected to each other. A two-dimensional X-ray sensor 104 and X-ray generation circuit 101 are connected to the data collecting circuit 105.

The image processing circuit 112 includes a region extracting circuit 113, change amount setting circuit 114, histogram generation circuit 115, LUT generation circuit 116, changing circuit 117, feature amount extracting circuit 118, and tone processing circuit 119. These circuits are connected to the CPU bus 107.

In the X-ray imaging device 100, the main memory 109 stores various kinds of data necessary for processing by the CPU 108 and also functions as the working memory of the CPU 108. The CPU 108 controls the operation of the whole apparatus in accordance with the operation from the operation panel 110. The X-ray imaging device 100 operates in the following way.

When an image capture instruction is input from the user through the operation panel 110, the image capture instruction is transmitted to the data collecting circuit 105 by the CPU 108. When the image capture instruction is received, the CPU 108 controls the X-ray generation circuit 101 and two-dimensional X-ray sensor 104 and causes them to execute X-ray imaging.

In X-ray imaging, the X-ray generation circuit 101 radiates an X-ray beam 102 to a subject 103. The X-ray beam 102 radiated from the X-ray generation circuit 101 passes through the subject 103 while attenuating and arrives at the two-dimensional X-ray sensor 104. The two-dimensional X-ray sensor 104 outputs an X-ray image signal. In this embodiment, the subject 103 is a human body. That is, the X-ray image output from the two-dimensional X-ray sensor 104 is a human body image.

The data collecting circuit 105 converts the X-ray image signal output from the two-dimensional X-ray sensor 104 into a predetermined digital signal and supplies it to the preprocessing circuit 106 as X-ray image data. The preprocessing circuit 106 executes preprocessing such as an offset correction process or gain correction process for the signal (X-ray image data) from the data collecting circuit 105. The X-ray image data which has undergone the preprocessing by the preprocessing circuit 106 is transferred as original image data to the main memory 109 and image processing circuit 112 through the CPU bus 107 under the control of the CPU 108.

In the image processing circuit 112, the region extracting circuit 113 extracts the region of interest from the input image. The change amount setting circuit 114 sets the dynamic range change amount of the region of interest extracted by the region extracting circuit 113. The histogram generation circuit 115 generates the histogram of the region of interest extracted by the region extracting circuit 113.

The LUT generation circuit 116 generates an LUT to be used for dynamic range change of the process target image. Especially, in this embodiment, on the basis of the histogram value in each pixel value interval of the histogram generated by the histogram generation circuit 115, an LUT is generated in which the region of interest extracted by the region extracting circuit 113 has the dynamic range set by the change amount setting circuit 114. The changing circuit 117 changes the dynamic range on the basis of the LUT generated by the LUT generation circuit 116.

The feature amount extracting circuit 118 extracts a feature amount necessary for tone processing. The tone processing circuit 119 executes tone conversion in accordance with the feature amount extracted by the feature amount extracting circuit 118.

The operation of the X-ray imaging device according to this embodiment with the above-described arrangement will be described below in more detail.

Figure 2:
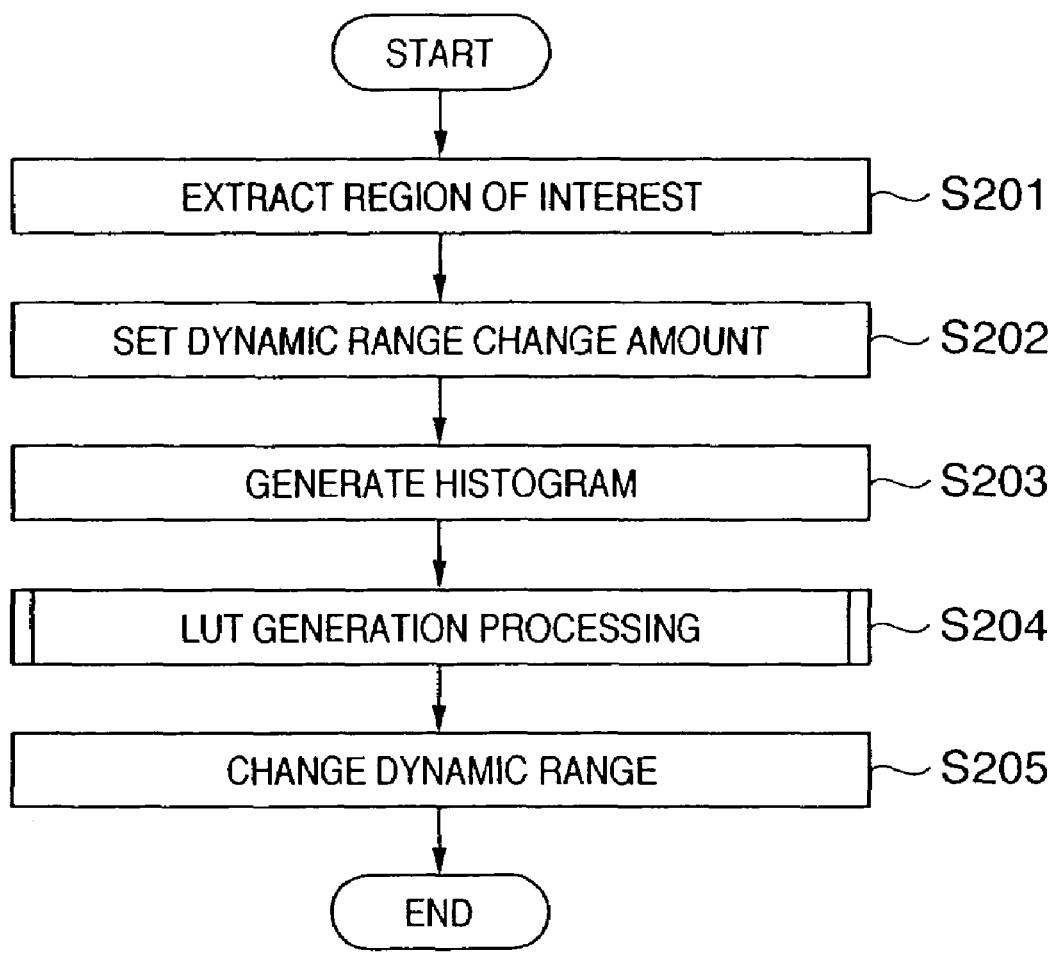
FIG. 2 is a flowchart showing dynamic range change processing by an image processing circuit according to the embodiment of the present invention.

FIG. 2 is a flowchart showing dynamic range change processing by the image processing circuit according to the embodiment of the present invention.

Original image data obtained by the preprocessing circuit 106 is transferred to the image processing circuit 112 through the CPU bus 107.

In step S201, the region extracting circuit 113 in the image processing circuit 112 extracts the region of interest from the original image data. In this case, a region to be output to an output medium (e.g., image display circuit 111 or film output) is calculated.

For example, a subject region except the direct irradiated region is extracted. The calculation method is not particularly limited. For example, the 90% value of the maximum pixel value of the entire input image is calculated as Th1. An image f1(x,y) obtained by deleting, from an input image f(x,y), the direct irradiated region and a subject region which contacts the direct irradiated region at a predetermined interval or less is calculated by $$f1(x, y) = f(x, y) \times \prod_{x1=-d1}^{x1=d1} \prod_{y1=-d2}^{y1=d2} sgn(x + x1, y + y1) \quad (4)$$

for $sgn(x, y) = 0$ when $f(x, y) \geq Th1$ $sgn(x, y) = 0$ otherwise where d1 and d2 are constants to determine the width of the predetermined interval in deleting, from the input image f(x, y), the direct irradiated region and the subject region which contacts the direct irradiated region at a predetermined interval or less. The constants d1 and d2 are set on the basis of the size of the input image f(x,y).

The subject region is calculated from the image f(x,y) without the direct irradiated region on the basis of the maximum and minimum values except a pixel value of 0. This method has already been proposed by the present applicant (Japanese Patent Laid-Open No. 2001-094828).

The region of interest need not always be the subject region except the direct irradiated region. A specific part in the subject may be extracted as the region of interest. The region of interest may manually be set.

In step S202, the change amount setting circuit 114 sets the dynamic range change amount of the region of interest extracted by the region extracting circuit 113. The dynamic range change amount setting method is not particularly limited. It may be set manually or calculated on the basis of the dynamic range of the output medium or a tone conversion curve to be used in output. In this embodiment, the user can manually set the dynamic range change amount on the operation panel 110.

In step S203, the histogram generation circuit 115 generates a histogram based on the pixel value of the region of interest extracted by the region extracting circuit 113. A density value histogram representing the appearance frequency for the pixel value or a differential histogram representing the sum of differential values for the pixel value is generated as the histogram. In the density value histogram, image information concentrates to a region where the appearance frequency is high. In the differential histogram, edges with a large pixel value gradient concentrate to a region where the sum of differential values is large.

In step S204, the LUT generation circuit 116 executes LUT generation processing of generating an LUT on the basis of the histogram value in each pixel value interval of the histogram generated by the histogram generation circuit 115.

Figure 3:
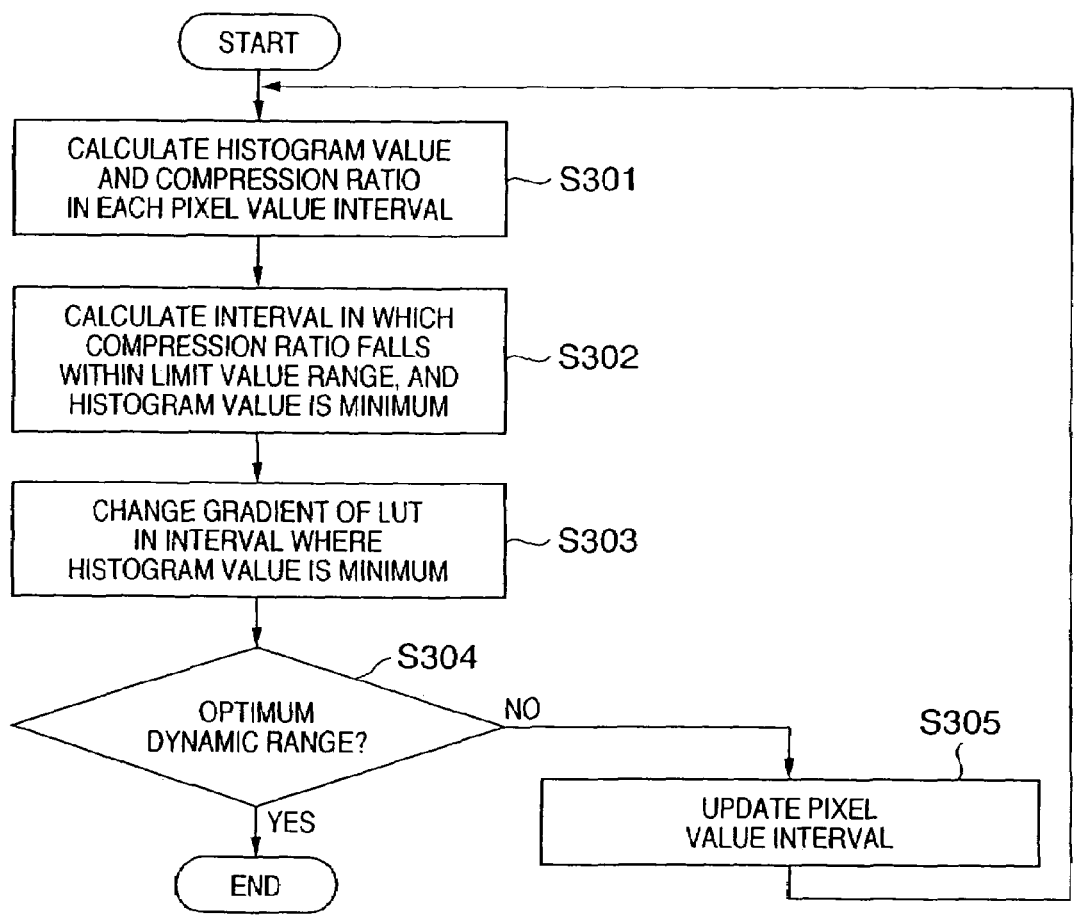
FIG. 3 is a flowchart showing compression LUT generation processing according to the embodiment of the present invention.
Figure 4:
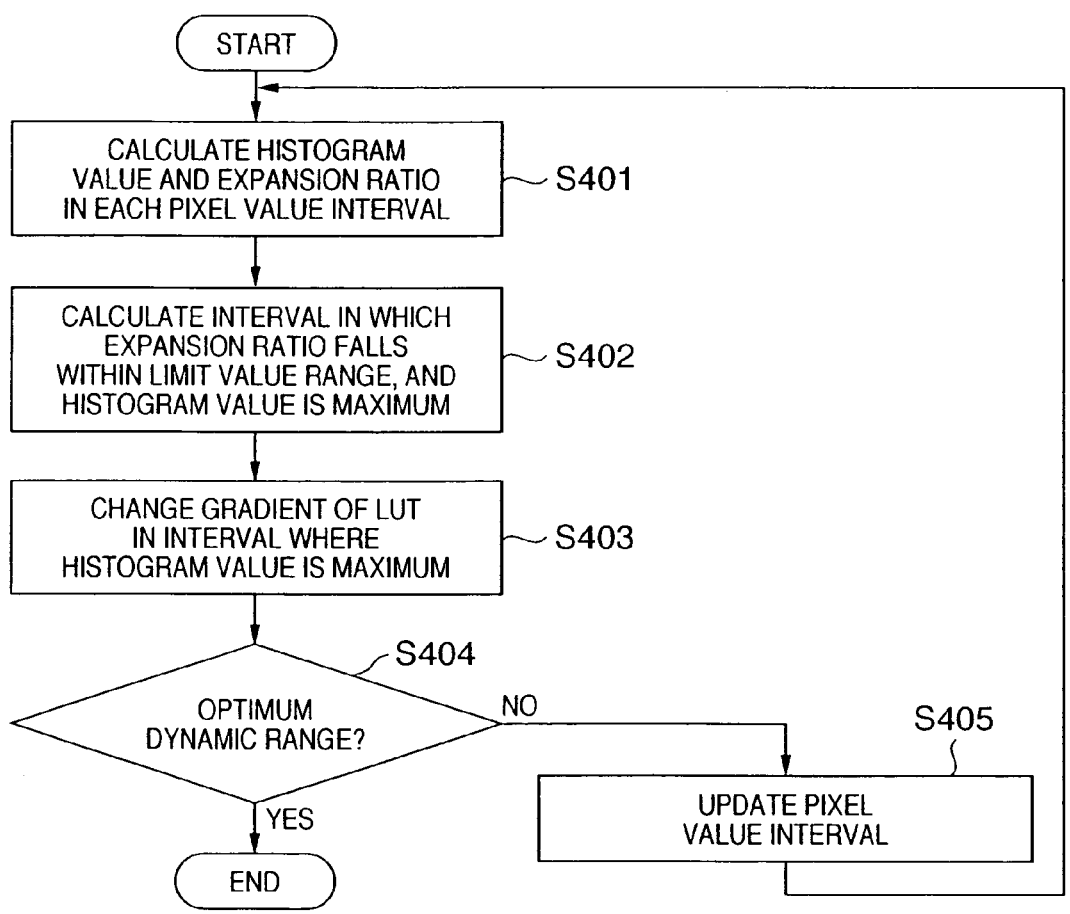
FIG. 4 is a flowchart showing expansion LUT generation processing according to the embodiment of the present invention.

LUT generation processing will be described in detail with reference to FIGS. 3 and 4. FIG. 3 shows compression LUT generation processing of generating a compression LUT to compress the dynamic range. FIG. 4 shows expansion LUT generation processing of generating an expansion LUT to expand the dynamic range.

Which of compression and expansion should be executed is determined on the basis of the dynamic range set by the change amount setting circuit 114 and the dynamic range of the region of interest of the image.

LUT generation processing will be described below with reference to the flowcharts shown in FIGS. 3 and 4.

Compression LUT generation processing for dynamic range compression will be described with reference to the flowchart shown in FIG. 3.

In step S301, the histogram value and compression ratio in each pixel value interval are calculated. The initial interval serving as the unit for calculation of the histogram value and compression ratio can be set without making intervals overlap, as indicated by a and b in FIG. 5A, or while making intervals overlap, as indicated by a and b in FIG. 5B.

Figure 5:
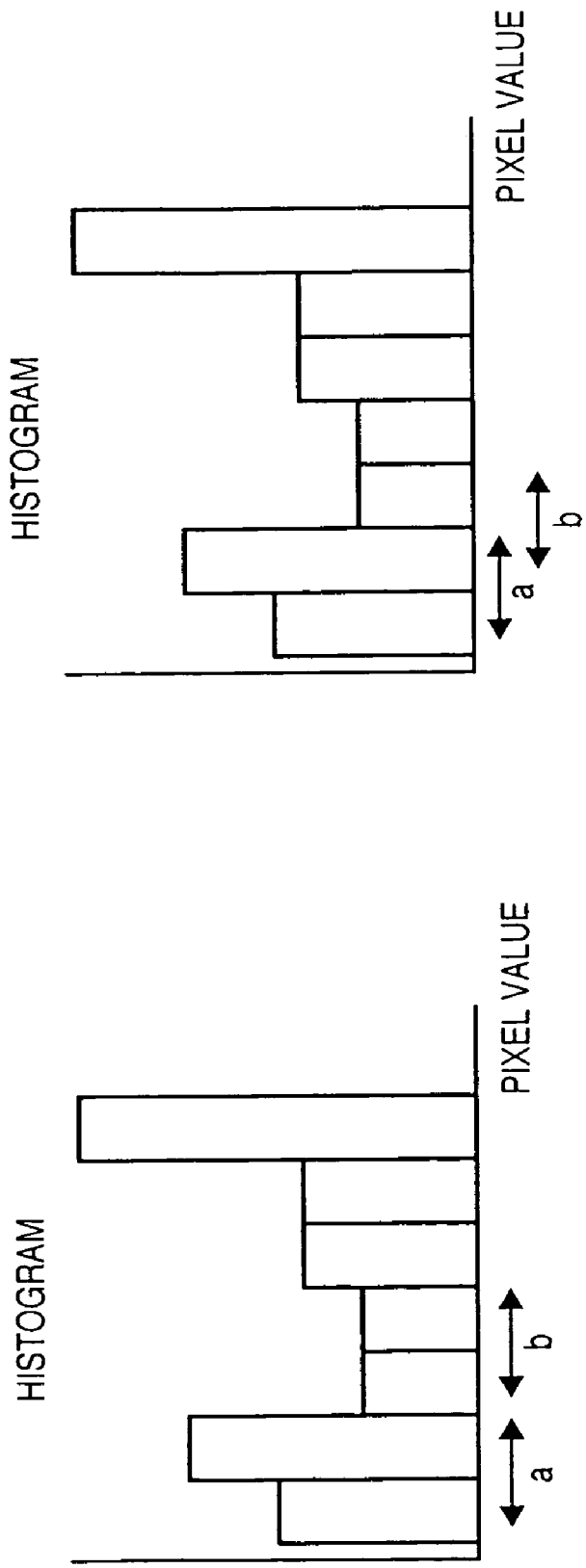
FIG. 5A is a graph showing an example of a method of dividing the pixel value interval of a histogram according to the embodiment of the present invention.
FIG. 5B is a graph showing another example of the method of dividing the pixel value interval of a histogram according to the embodiment of the present invention.
Figure 6:
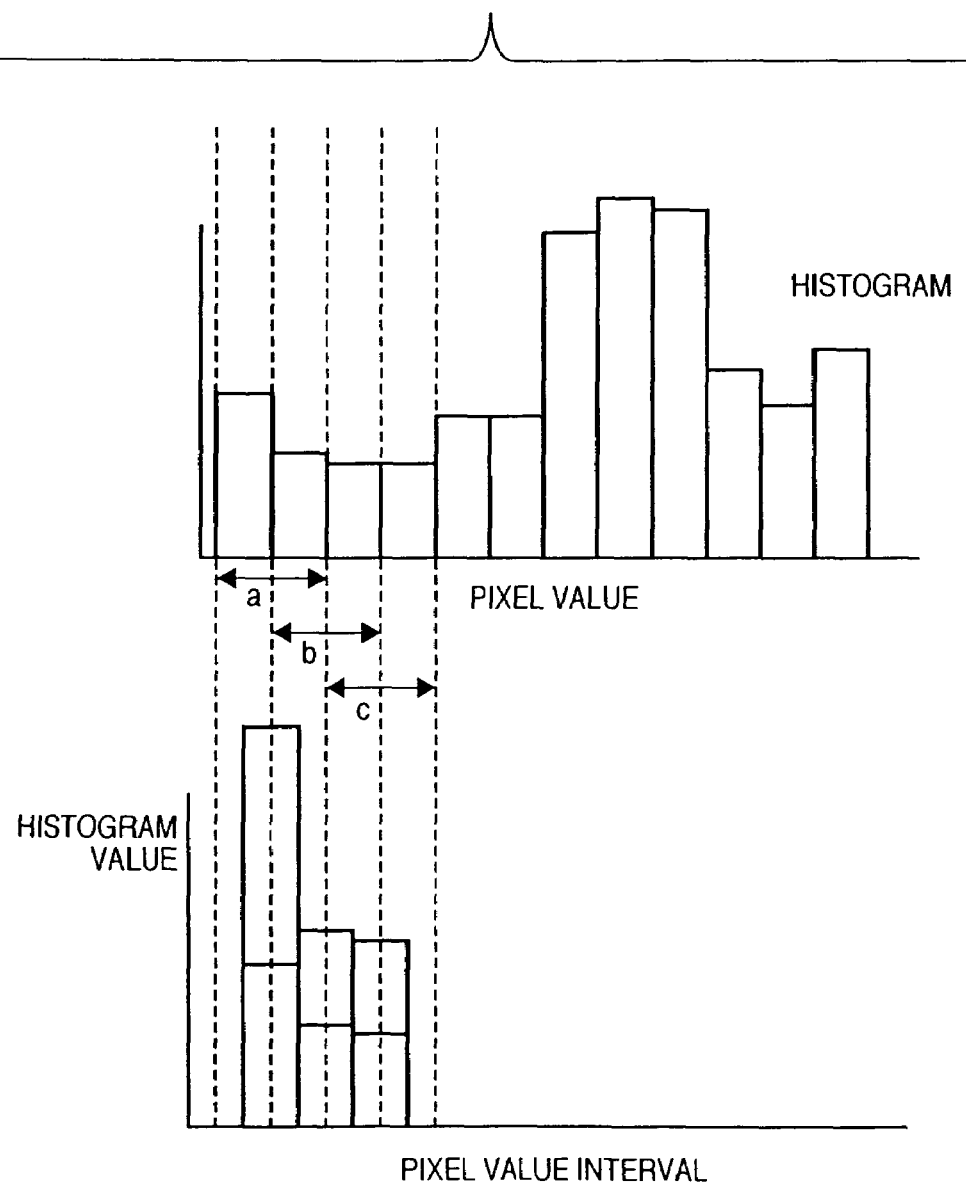
FIG. 6 is a graph for explaining a method of calculating the histogram value in the pixel value interval according to the embodiment of the present invention.

In this embodiment, every two tones are set as an interval while making intervals overlap, as shown in FIG. 5B. As the histogram value in each interval, the sum of histogram values within the pixel value width set as shown in FIG. 6 is calculated. The compression ratio in each interval is defined as 1/(number of input tones in interval). As the compression ratio becomes smaller than 1, the degree of compression increases. In this embodiment, since the number of input tones in an interval is 2 in the initial state, the compression ratio is 1/2.

In step S302, an interval in which the compression ratio falls within the limit value range, and the histogram value is minimum is searched for. The limit value of the compression ratio is set between 0 (exclusive) and 1 (exclusive). The purpose is to prevent the compression ratio in each interval from becoming excessively low. The range is calculated and set empirically. When the limit value is set, any excessive decrease in contrast by compression can be suppressed.

In step S303, the gradient of LUT in the interval where the histogram value is minimum is changed.

Figure 7:
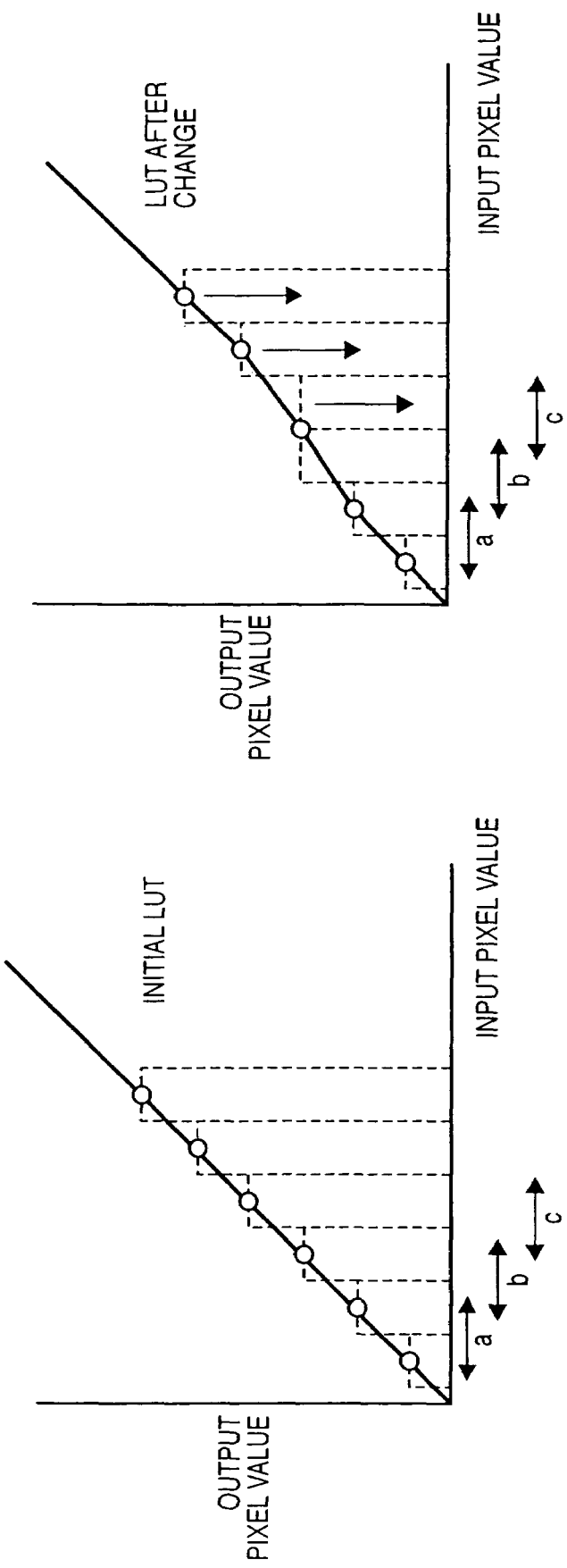
FIG. 7A is a graph for explaining the LUT change procedure according to the embodiment of the present invention.
FIG. 7B is a graph for explaining the LUT change procedure according to the embodiment of the present invention.

More specifically, the LUT is changed such that output pixel values in intervals become equal. For example, FIG. 7A shows the LUT in the initial state. The LUT in the initial state is linear. The number of input tones equals the number of output tones. In the histogram shown in FIG. 6, the histogram value is minimum in an interval c. The LUT is changed such that identical pixel values are output in this interval, as shown in FIG. 7B. In addition, to maintain the original gradient in intervals except the interval c, the pixel values in the intervals following the interval c are shifted at the same ratio. Not the intervals following the interval c but those before the interval c may be shifted.

In step S304, it is determined whether the dynamic range is optimum. Whether the dynamic range is optimum is determined by determining whether the dynamic range set by the change amount setting circuit 114 equals the output dynamic range of the generated LUT. If the dynamic ranges equal, i.e., the dynamic range is optimum (YES in step S304), LUT generation is ended. If the dynamic ranges do not equal, i.e., the dynamic range is not optimum (NO in step S304), the flow advances to step S305 to further change the LUT.

In step S305, when the dynamic range should be further compressed, each pixel value interval is updated. Then, in step S301, the histogram value and compression ratio in each interval are calculated again.

Figure 8:
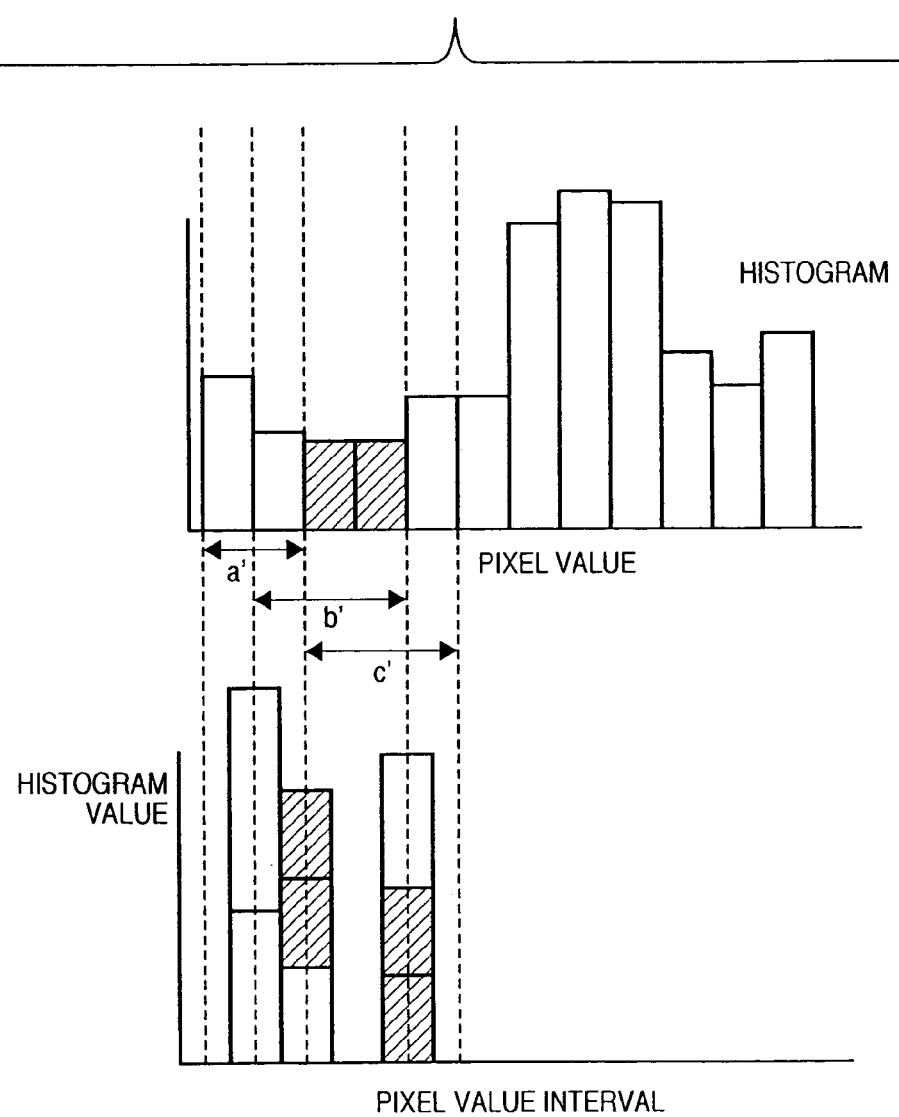
FIG. 8 is a graph for explaining a method of re-dividing the pixel value interval of the histogram according to the embodiment of the present invention.

Since the output pixel values in the interval c in FIG. 6 are already unified, the pixel values in the interval c are coupled. The intervals are updated to a', b', and c', as shown in FIG. 8.

The flow returns to step S301 to recalculate the sum of histogram values in each updated interval. Since the number of input tones in the intervals b' and c' is 3, the compression ratio in the intervals b' and c' is updated to 1/3.

Figure 9B:
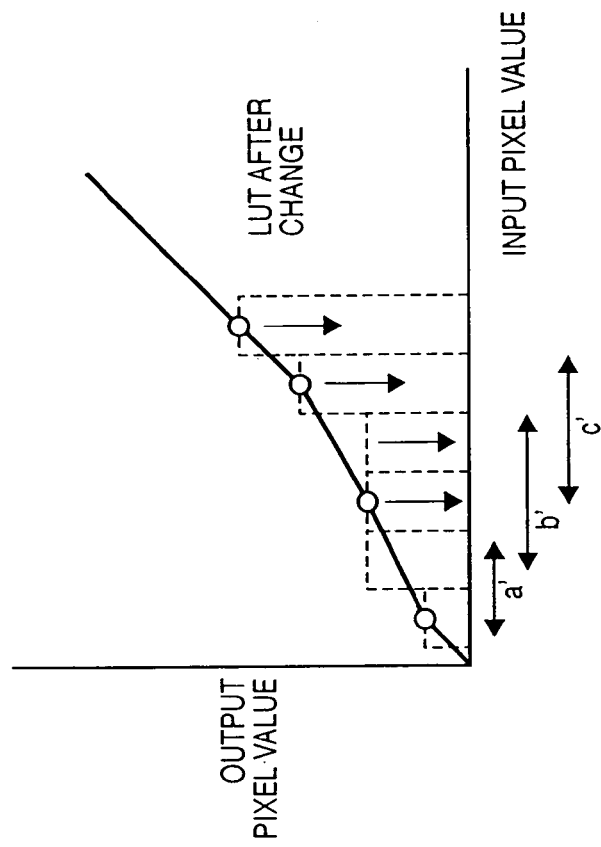
FIG. 9B is a graph for explaining the LUT change procedure according to the embodiment of the present invention.
Figure 9A:
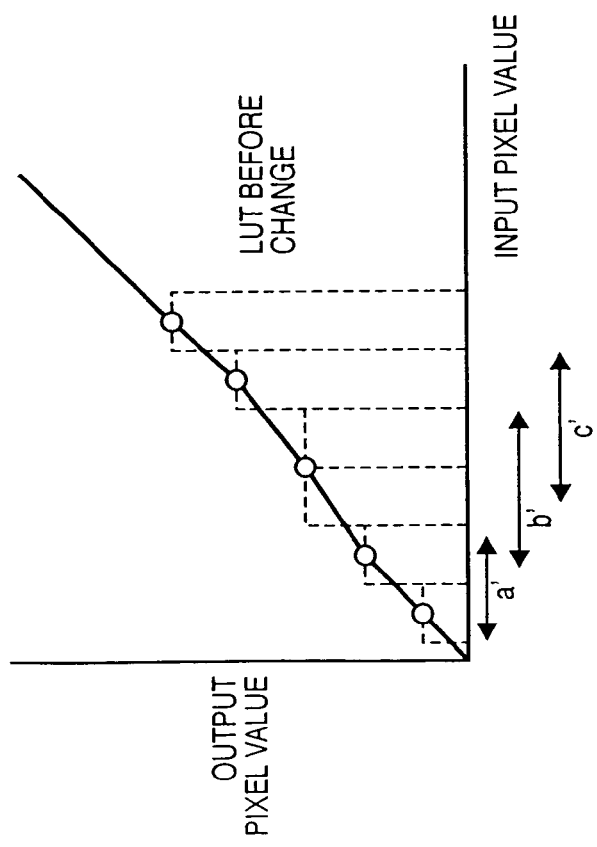
FIG. 9A is a graph for explaining the LUT change procedure according to the embodiment of the present invention.

In steps S302 and S303, the LUT is changed again. Referring to FIG. 8, the histogram value is minimum in the interval b'. Hence, the updated LUT shown in FIG. 9A is further changed to that shown in FIG. 9B.

The above-described series of operations is repeatedly executed until a desired dynamic range is obtained, thereby generating an optimum LUT. More specifically, to compress the dynamic range, the LUT is generated by changing it such that the output pixel value difference sequentially becomes small from the pixel value interval where the histogram value is small until the output dynamic range equals the desired dynamic range.

When the compression LUT is generated on the basis of the density value histogram, a region with a low-density distribution is preferentially compressed. Since the number of pixels compressed in the entire image is decreased to minimum and necessary, the decrease in contrast in the entire image can be suppressed as much as possible.

When the differential histogram is used, the magnitude of gradient of an edge is reflected. For this reason, compression of a region with a large edge gradient is suppressed as much as possible. Hence, even in dynamic range compression, artifacts can be suppressed. Additionally, since the compression ratio has the limit value, any excessive decrease in contrast in a local region can be suppressed.

Expansion LUT generation processing for dynamic range expansion will be described with reference to the flowchart shown in FIG. 4.

Figure 10:
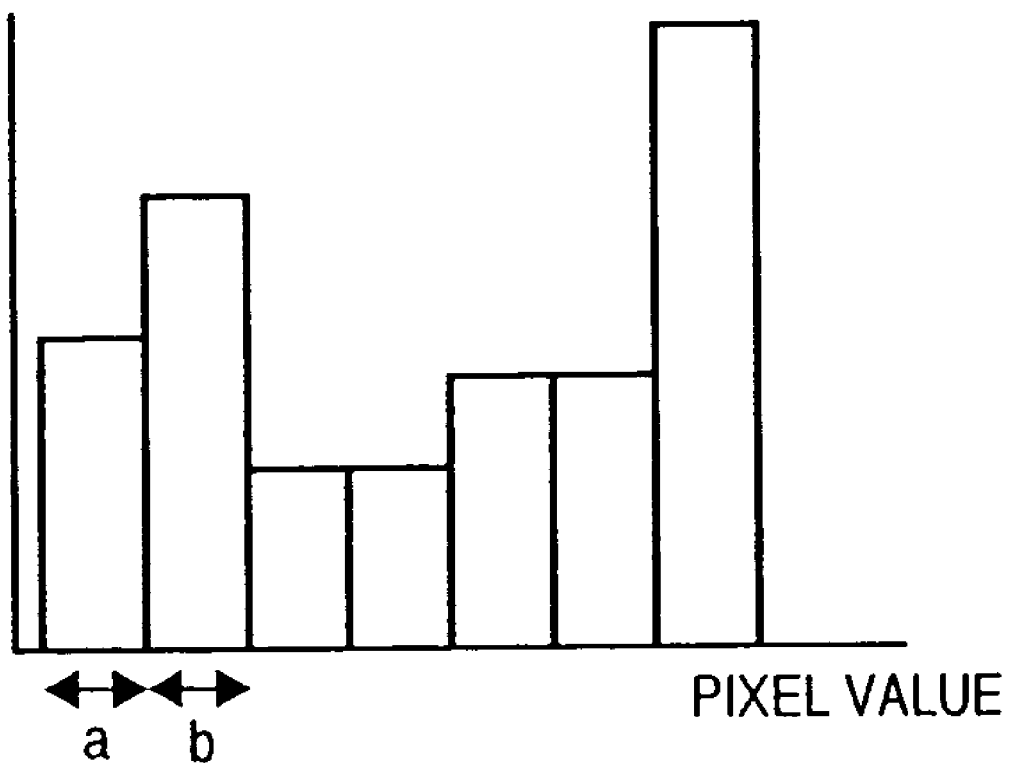
FIG. 10 is a graph showing an example of the method of dividing the pixel value interval of the histogram according to the embodiment of the present invention.

In step S401, the histogram value and expansion ratio in each pixel value interval are calculated. The initial interval serving as the unit for calculation of the histogram value and expansion ratio is set as shown in FIG. 10. In this embodiment, every tone is set as an initial interval, as shown in FIG. 10. The histogram value in each interval is calculated in the same way as in compression.

The expansion ratio is defined as 2/(number of input tones in interval). As the expansion ratio becomes larger than 1, the degree of expansion increases. In this embodiment, since the number of input tones in an interval is 1 in the initial state, the expansion ratio is 2/1.

In step S402, an interval in which the expansion ratio falls within the limit value range, and the histogram value is maximum is searched for. The limit value of the expansion ratio is calculated and set empirically within the range larger than 1. The expansion ratio is limited for the purpose of preventing the expansion ratio in each interval from becoming excessively high. When the limit value is set, any excessive increase in contrast by expansion can be suppressed.

In step S403, the gradient of LUT in the interval where the histogram value is maximum is changed.

More specifically, the LUT is changed by equally dividing the interval into two parts to increase the output pixel value. For example, referring to FIG. 11, the histogram value is maximum in the interval c. The interval c in the initial LUT shown in FIG. 12A is equally divided into two parts to increase the output value difference by one step, as shown in FIG. 12B. In addition, to maintain the original gradient in intervals following the interval c, the pixel values in the intervals following the interval c are shifted at the same ratio. Not the intervals following the interval c but those before the interval c may be shifted.

In step S404, it is determined whether the dynamic range is optimum. Whether the dynamic range is optimum is determined by determining whether the dynamic range set by the change amount setting circuit 114 equals the output dynamic range of the generated LUT. If the dynamic ranges equal, i.e., the dynamic range is optimum (YES in step S404), LUT generation is ended. If the dynamic ranges do not equal, i.e., the dynamic range is not optimum (NO in step S404), the flow advances to step S405 to further change the LUT.

In step S405, when the dynamic range should be further expanded, each pixel value interval is updated. Then, in step S401, the histogram value and expansion ratio in each interval are calculated again.

Figure 11:
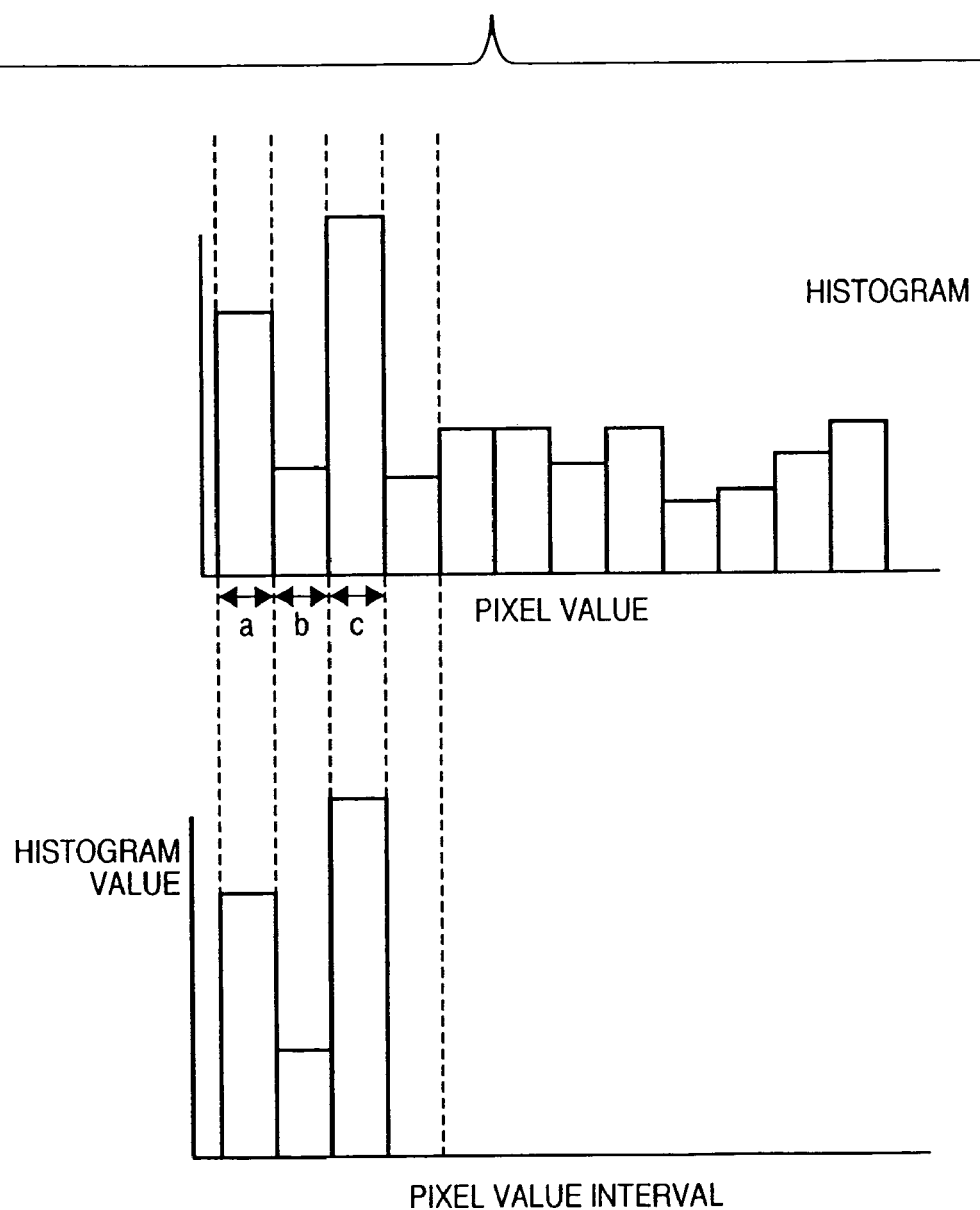
FIG. 11 is a graph for explaining a method of calculating the histogram value in the pixel value interval according to the embodiment of the present invention.
Figure 12:
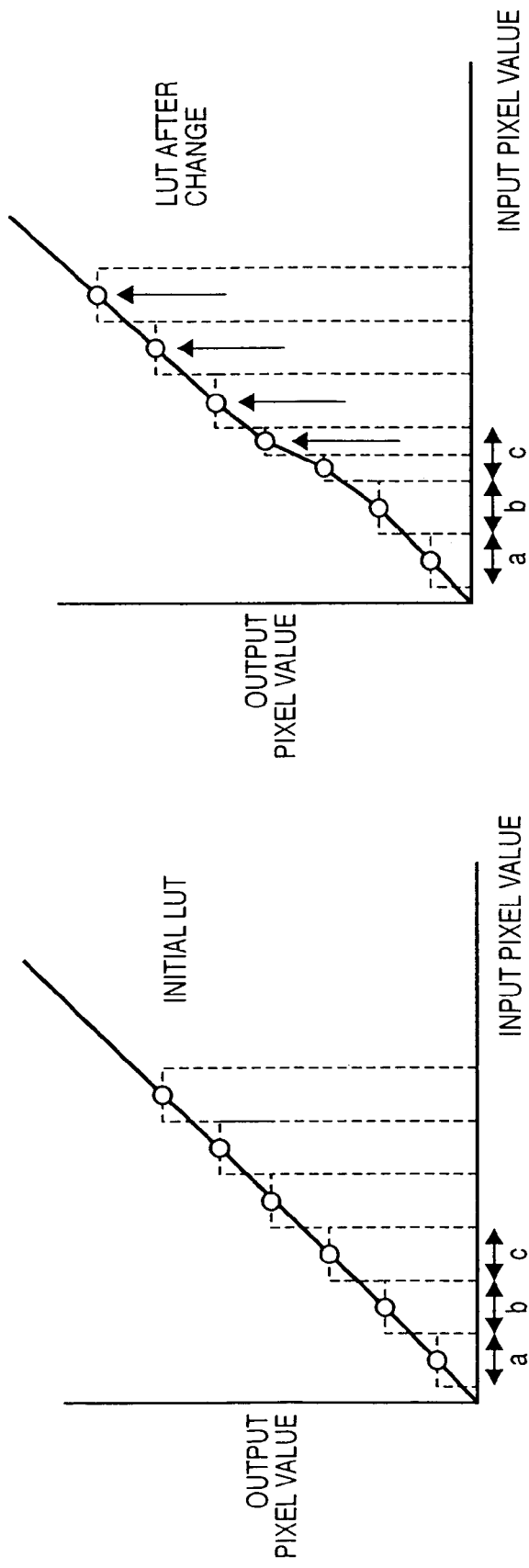
FIG. 12A is a graph for explaining the LUT change procedure according to the embodiment of the present invention.
FIG. 12B is a graph for explaining the LUT change procedure according to the embodiment of the present invention.
Figure 13:
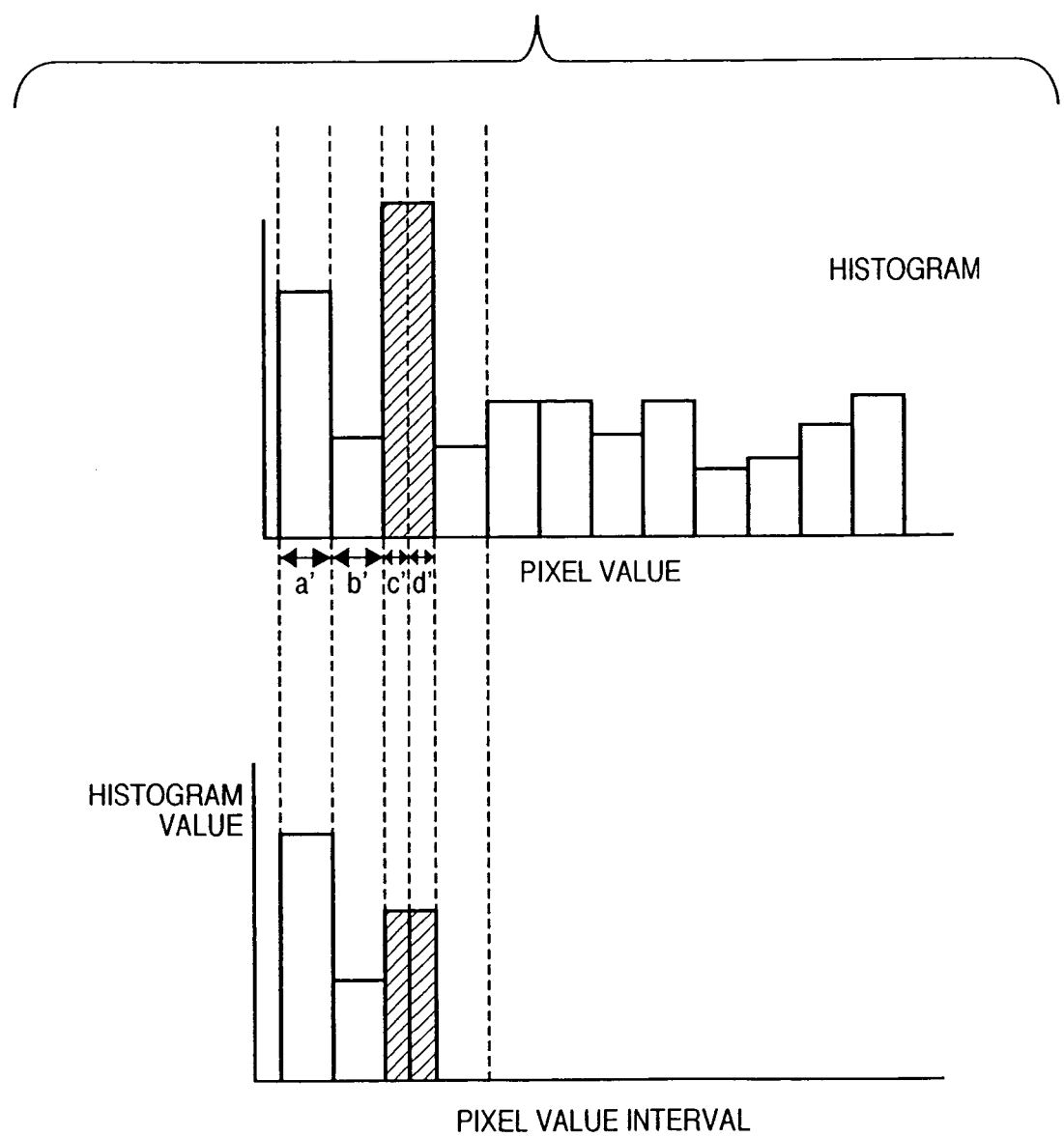
FIG. 13 is a graph for explaining a method of re-dividing the pixel value interval of the histogram according to the embodiment of the present invention.

Since the output pixel values in the interval c in FIG. 11 are already separated, the interval c is divided. The intervals are updated to a', b', c', and d' as shown in FIG. 13.

In step S401, the sum of histogram values in each updated interval is recalculated. Since the interval c is divided, each of the intervals c' and d' has a value obtained by equally dividing the histogram value in the interval c into two parts. Since the number of input tones in the intervals c' and d' is 0.5, the expansion ratio in the intervals c' and d' is updated to 2/0.5.

In steps S402 and S403, the LUT is changed again. Referring to FIG. 13, the histogram value is maximum in the interval a'. Hence, the updated LUT shown in FIG. 14A is further changed to that shown in FIG. 14B.

The above-described series of operations is repeatedly executed until the desired dynamic range is obtained, thereby generating an optimum LUT. More specifically, to expand the dynamic range, the LUT is generated by changing it such that the output pixel value difference sequentially becomes large from the pixel value interval where the histogram value is large until the output dynamic range equals the desired dynamic range.

When the expansion LUT is generated on the basis of the density value histogram, a region with a high-density distribution is preferentially expanded. Since the number of pixels expanded in the entire image is increased to maximum, an image with high contrast can be generated as a whole. Additionally, since the expansion ratio has the limit value, any excessive increase in contrast in a local region can be suppressed.

With the above-described processing, the compression or expansion LUT to compress or expand the dynamic range can be generated. The same processing is possible even when the histogram is thinned out in advance to increase the processing speed. A smooth LUT may be generated by executing function fitting for predetermined end points of the generated LUT all over. A plurality of process target regions may be set for the histogram, the compression or expansion LUT may be generated for each region, and the regions may be connected finally.

The description will be continued referring back to FIG. 2.

After LUT generation processing, in step S205, the changing circuit 117 changes the dynamic range of the image by using the LUT generated by the LUT generation circuit 116. To simply change the dynamic range of the image, the LUT is applied to the input image. The changing circuit 117 may execute dynamic range compression to hold the high-frequency component.

The dynamic range compression method is not particularly limited. When the method described in non-patent reference 2 described above is to be used, the function f1( ) of equation 3 is used as an LUT generated by this method. Alternatively, dynamic range compression by multi resolution decomposition using wavelet or Laplacian pyramid may be executed.

As described above, according to this embodiment, when the dynamic range of an image is to be changed, the degree of change is adjusted in accordance with the histogram value in each interval. Hence, in dynamic range compression, the decrease in contrast can be suppressed as much as possible. In dynamic range expansion, conversely, the contrast of the entire image can largely be increased.

When edge information is also taken into consideration, compression near edges where artifacts are readily generated can effectively be suppressed in dynamic range compression. Since a limit value is set for compression or expansion, any excessive variation in contrast in a local region can be suppressed.

When an LUT is generated on the basis of the histogram value in each pixel value interval, a flexible LUT corresponding to the information amount in each local region of the image can be generated.

When the dynamic range change amount is set, the dynamic range of the output medium or a desired dynamic range can be set. Hence, image processing can be executed with high degree of freedom.

When the region of interest is extracted in advance, image processing limited for the specific region can be executed.

When a density value histogram or differential histogram is used, a flexible LUT considering the density distribution or the magnitude of edge gradient can be generated.

In dynamic range compression, when a pixel value interval with a small histogram value is compressed, an LUT for a desired dynamic range can be generated while minimizing the decrease in contrast of the entire image.

In dynamic range expansion, when a pixel value interval with a large histogram value is expanded, an LUT for a desired dynamic range can be generated while greatly increasing the contrast of the entire image.

When a limit value is set for the compression ratio or expansion ratio in each pixel value interval, any excessive variation in contrast in a local region can be suppressed.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-141553 filed on May 11, 2004, the entire contents of which are hereby incorporated by reference herein.

What is claimed is:

1. An image processing apparatus which changes a dynamic range of an image, comprising:
 histogram generation means for generating a differential histogram of the image over pixel value intervals;
 LUT generation means for automatically generating an LUT used for changing the dynamic range of the image on the basis of a histogram value in each pixel value interval of the histogram generated by said histogram generation means without requiring user intervention; and
 changing means for changing the dynamic range of the image on the basis of the LUT generated by said LUT generation means,
 wherein, in compressing the dynamic range of the image, said LUT generation means, iteratively, makes the variation in output pixel values small in each pixel value interval where the histogram values in the pixel value interval are small, shifts the output pixel values in other pixel value intervals to maintain pixel gradients in these other pixel value intervals, and redefines the pixel value intervals, until an output dynamic range of the image equals a desired dynamic range, and
 wherein, in expanding the dynamic range of the image, said LUT generation means, iteratively, makes the variation in output pixel values large in each pixel value interval where the histogram values in the pixel value interval are large, shifts the output pixel values in other pixel value intervals to maintain pixel gradients in these other pixel value intervals, and redefines the pixel value intervals, until an output dynamic range of the image equals a desired dynamic range.

2. The apparatus according to claim 1, further comprising change amount setting means for setting a change amount of the dynamic range of the image,
 wherein said LUT generation means generates the LUT used for changing the dynamic range of the image, with which the dynamic range set by said change amount setting means is obtained, on the basis of the histogram generated by said histogram generation means.

3. The apparatus according to claim 1, further comprising:
 region extracting means for extracting a region of interest in the image; and
 change amount setting means for setting a change amount of the dynamic range in the region of interest extracted by said region extracting means,
 wherein said histogram generation means generates at least one of the density value histogram and the differential histogram in the region of interest extracted by said region extracting means, and
 said LUT generation means generates the LUT used for changing the dynamic range of the image, with which the dynamic range set by said change amount setting means is obtained in the region of interest extracted by said region extracting means, on the basis of the histogram generated by said histogram generation means.

4. The apparatus according to claim 1, wherein said LUT generation means sets a limit value for a compression ratio and expansion ratio in each pixel value interval and generates the LUT in a range of the limit value.

5. An image processing method of changing a dynamic range of an image, comprising:
 a histogram generation step of generating a differential histogram of the image over pixel value intervals;
 an LUT generation step of automatically generating an LUT used for changing the dynamic range of the image on the basis of a histogram value in each pixel value interval of the histogram generated in the histogram generation step without requiring user intervention; and
 a changing step of changing the dynamic range of the image on the basis of the LUT generated in the LUT generation step,
 wherein, in compressing the dynamic range of the image, said LUT generation means, iteratively, makes the variation in output pixel values small in each pixel value interval where the histogram values in the pixel value interval are small, shifts the output pixel values in other pixel value intervals to maintain pixel gradients in these other pixel value intervals, and redefines the pixel value intervals, until an output dynamic range of the image equals a desired dynamic range, and
 wherein, in expanding the dynamic range of the image, said LUT generation means, iteratively, makes the variation in output pixel values large in each pixel value interval where the histogram values in the pixel value interval are large, shifts the output pixel values in other pixel value intervals to maintain pixel gradients in these other pixel value intervals, and redefines the pixel value intervals, until an output dynamic range of the image equals a desired dynamic range, and wherein said steps are performed by means of a computer.

6. A computer-readable medium, storing, in executable form, a program which causes a computer to implement an image processing method of changing a dynamic range of an image, said method comprising:

- a histogram generation step of generating a differential histogram of the image over pixel value intervals;
- an LUT generation step of automatically generating an LUT used for changing the dynamic range of the image on the basis of a histogram value in each pixel value interval of the histogram generated in the histogram generation step without requiring user intervention; and
- a changing step of changing the dynamic range of the image on the basis of the LUT generated in the LUT generation step, wherein, in compressing the dynamic range of the image, said LUT generation step, iteratively, makes the variation in output pixel values small in each pixel value interval where the histogram values in the pixel value interval are small, shifts the output pixel values in other pixel value intervals to maintain pixel gradients in these other pixel value intervals, and redefines the pixel value intervals, until an output dynamic range of the image equals a desired dynamic range, and wherein, in expanding the dynamic range of the image, said LUT generation step, iteratively, makes the variation in output pixel values large in each pixel value interval where the histogram values in the pixel value interval are large, shifts the output pixel values in other pixel value intervals to maintain pixel gradients in these other pixel value intervals, and redefines the pixel value intervals, until an output dynamic range of the image equals a desired dynamic range.

* * * * *